United States Patent [19]

Strosser et al.

[11] 4,344,074
[45] Aug. 10, 1982

[54] MAGNETIC FIELD PRODUCING APPARATUS

[75] Inventors: Richard P. Strosser, Akron; Mark K. Chow, Leola; Carl E. Bohman, New Holland, all of Pa.

[73] Assignee: Sperry Corporation, New Holland, Pa.

[21] Appl. No.: 250,510

[22] Filed: Apr. 2, 1981

[51] Int. Cl.³ .............................................. G08B 21/00
[52] U.S. Cl. ...................................... 340/684; 56/10.2; 56/DIG. 15; 324/232; 340/551
[58] Field of Search ................ 340/684, 551; 324/232, 324/228; 56/10.2, DIG. 15

[56] References Cited
U.S. PATENT DOCUMENTS

| | | | |
|---|---|---|---|
| 3,324,639 | 6/1967 | Halls et al. | 56/14.4 |
| 3,523,411 | 8/1970 | Waldrop et al. | 53/344 |
| 3,758,849 | 9/1973 | Susman et al. | 56/DIG. 15 |
| 3,889,249 | 6/1975 | Bennett, Jr. et al. | 340/684 |
| 3,964,042 | 6/1976 | Garrott | 340/684 |
| 3,972,156 | 8/1976 | Bennett, Jr. et al. | 340/684 |

Primary Examiner—Glen R. Swann, III
Attorney, Agent, or Firm—Frank A. Seemar; Larry W. Miller; Darrell F. Marquette

[57] ABSTRACT

Metal detectors having parallel magnetic fields produce signals which vary depending upon the shape and orientation of a metal object passing through the field. An improved metal detector sensor includes a magnet of special configuration having a multi-directional magnetic field resulting in a detector which is insensitive to orientation of the detected metal. One embodiment of the magnet is a pattern of cylindrical poles with the opposing pole central to the cylinder, thus creating a multiplicity of radially extending magnet fields. An alternate embodiment of the invention is an offset pattern of opposite poles which create two groups of fields, each at an angle to the general direction of movement of the material fed into the machine.

3 Claims, 4 Drawing Figures

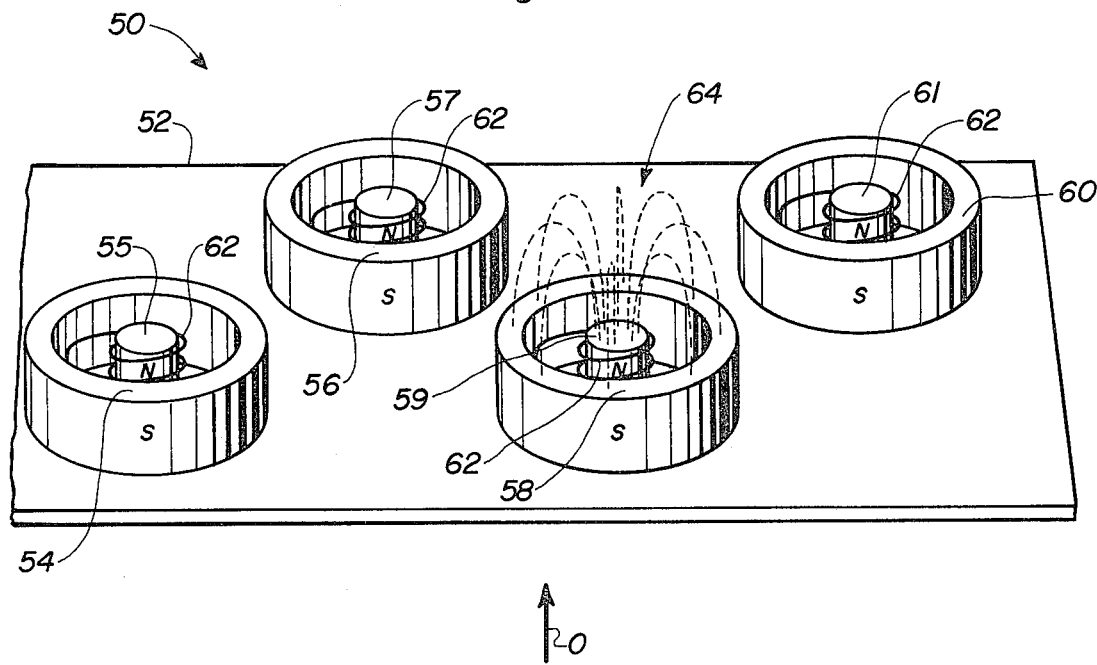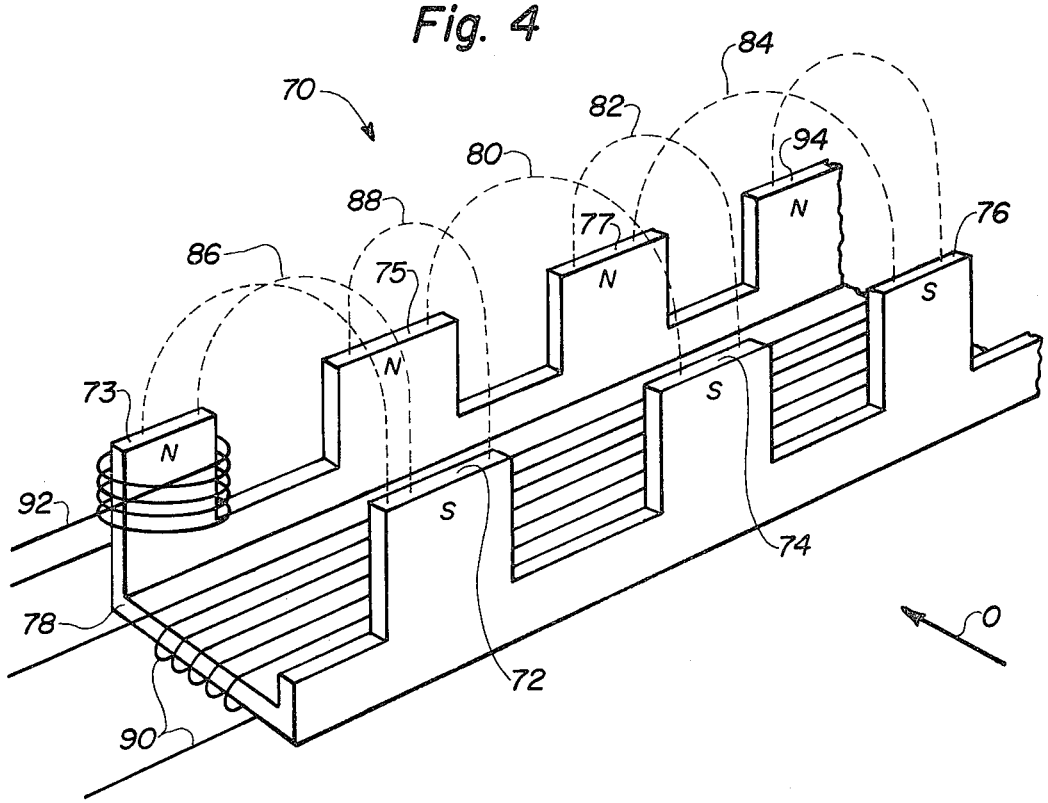

4,344,074

MAGNETIC FIELD PRODUCING APPARATUS

BACKGROUND OF THE INVENTION

This invention relates generally to apparatus for detecting the passage of objects composed at least in part of metallic or magnetic materials, including iron and steel, and more particularly to an improved configuration of magnetic field and sending coils for such detecting systems.

This invention is an improvement upon the metal detecting apparatus of the type using a magnetic detector for machinery having a magnetic field and generating means which results in magnetic fields which are essentially parallel to the direction of travel of material being fed into the machines. The orientation of these magnetic fields creates a distinct sensitivity pattern in the metal detecting action. The electrical signal from these existing detectors varies considerably with the orientation of the metal piece being sensed, because when the orientation of a piece of metal with a long narrow configuration is such that its principle axis is transverse to the magnetic lines of flux, the electrical signal is somewhat diminished. However, when the same shape of metal passes through the magnetic field with its principle axis orientation parallel to the lines of flux, that is, essentially spanning the gap between magnetic poles, the signal is strong. Such a variation results in a detection performance which varies with target orientation.

The foregoing illustrates limitations of the known prior art. Thus, it is apparent that it would be advantageous to provide an alternative directed to overcoming one or more of the limitations as set forth above.

Accordingly, a suitable alternative is to use magnetic members which create multi-directional magnetic fields and corresponding sensing coils which sense all metal passing within the fields at approximately the same signal level without being severely diminished for any particular orientation.

SUMMARY OF THE INVENTION

In one aspect of the present invention this is accomplished by providing an improved metal detector including means for producing a pattern of magnetic fields in a path of material flow. Portions of the fields are not parallel to each other. The means is a magnetic configuration having a plurality of magnet members. Ones of the magnet members are in a first row and others of the magnet members are in a second row. The rows are transverse to the material flow path. The magnet members of the first row are in staggered relationship with the magnet members of the second row.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 3 is one embodiment of the improved metal detector of the invention.

FIG. 4 is an alternate embodiment of the metal detector of the invention.

DETAILED DESCRIPTION OF THE INVENTION

Figure 1:
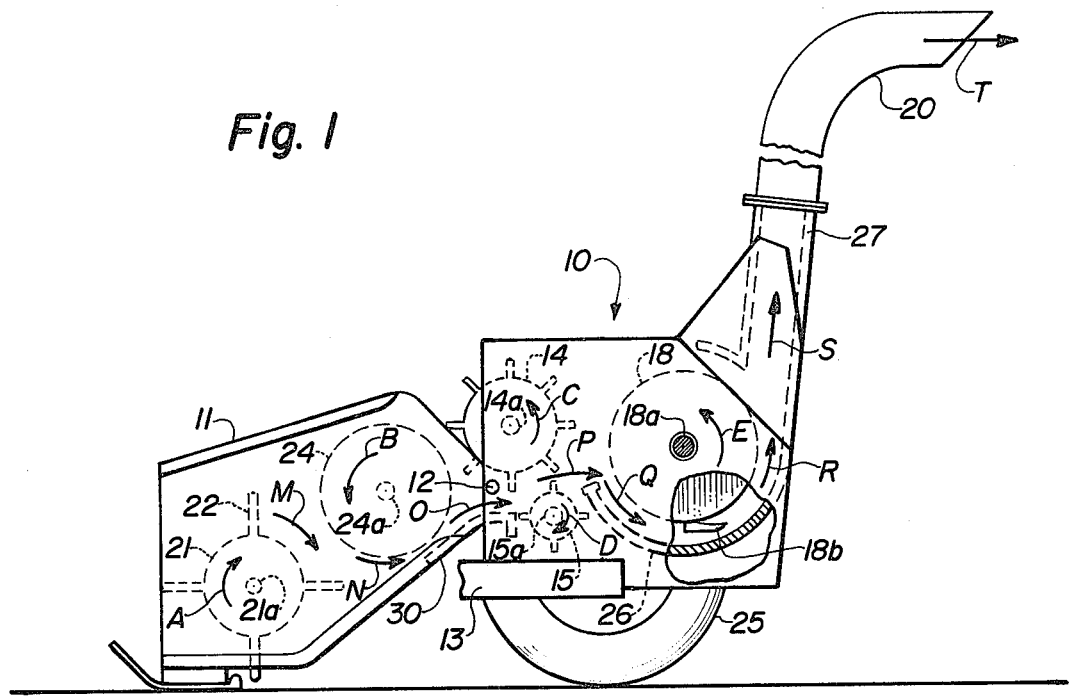
FIG. 1 is a fragmentary elevation view, partly in cross section, of a forage harvesting machine illustrating one application of the invention.

FIG. 1 illustrates an improved forage harvesting machine of the kind in which the present invention may be employed. It is apparent that the invention may also be employed with benefit for the protection of other types of farm and general utility machinery, and that it has other monitoring and alarm actuating applications aside from protecting farm machinery from damage caused by the ingestion of objects of metallic or magnetic materials. The particular forage harvester of FIG. 1 is a representative farm machine and is similar to that described by T. W. Waldrop and H. C. Eberly in U.S. Pat. No. 3,523,411 for a "Forage Harvester Device", issued Aug. 11, 1970, and assigned to the Sperry Rand Corporation.

The forage harvester of FIG. 1 includes a wheel mounted frame or housing construction 10 for supporting a forage cutterhead 18 and a crop pickup unit 11 is pivotally mounted at 12 for support in part from the basic vehicle framework 13 by which the harvester may be towed by a suitable tractor (not shown). The harvester further includes at least one set of infeed conveyor rolls 14 and 15, mounted for rotation about substantially parallel axes 14a, 15a and journaled in housing 10. A forage cutterhead assembly 18 is mounted within housing 10 spaced from rolls 14,15 for rotation on shaft 18a and for receiving forage material ejected from rolls 14,15. A discharge spout 20 extends generally vertically and then horizontally from the rearward portion of housing 10.

The crop pickup unit 11 comprises a conventional rotatable reel 21 on a shaft 21a having plural radially projecting, laterally spaced pickup tines or fingers, such as tine 22. A plurality of conventional laterally spaced stripping or doffing members (not shown), between which the tines 22 pass as reel 21 rotates the tines into housing 11, lifts the crop into the region of influence of a conventional rotatable auger 24. Auger 24 has oppositely directed helical flights for directing the crop material from both sides of the auger input toward its center and, therefore, into the input of the infeed conveyor rolls 14,15. Auger 24 is mounted for rotation on shaft 24a and may be of the general type described by L. M. Halls and H. G. McCarty in U.S. Pat. No. 3,324,639 for "Auger Header and Crop Conditioner", issued June 13, 1967, and assigned to the Sperry Rand Corporation.

Although a crop pickup 11 is shown in FIG. 1, it is apparent that a sickle bar or row crop attachment could also be employed to deliver crop material into infeed rolls 14,15. In the unit shown, harvested crop material to be comminuted is picked up by the reel 21 and auger 24 of crop pickup unit 11 and is delivered by them to the infeed rolls 14,15. From the rolls 14,15, the crop material is metered in a compacted mat-like form to cutterhead 18, where it is comminuted by a rotating array of knives such as knife 18b and is finally discharged through spout 20 into a suitable receptacle, such as a truck or farm wagon (not shown).

Upon consideration of the above-mentioned Waldrop et al. U.S. Pat. No. 3,523,411, it will be clear that, for the sake of simplifying the drawing of FIG. 1, a vehicle wheel companion to wheel 25 has not been shown in the drawing of FIG. 1. Also, a plurality of drive belts or other drive means by virtue of which elements including reel 21, auger 24, and rolls 14 and 15 are driven with respect to the power source driving shaft 18a and, therefore, with respect to cutterhead 18 are absent for the sake of simplifying FIG. 1. Such devices are fully described in the above-mentioned Waldrop et al patent and elsewhere and provide means for driving the various rotatable elements at appropriate rotational speeds in the directions indicated by arcuate arrows A,B,C,D and E. When operated in such fashion, the flow of crop material is over reel 21 and into auger 24 along the paths of arrows M and N and along path O into rolls 14,15. Ejected from rolls 14,15 along path P into cutterhead 18, the cut forage then follows paths Q and R between the rotating cutterhead 18 and guide 26, and finally moves upward along path S within pipe 27 and out of spout 20 along path T. In traversing paths N and O toward rolls 14,15, the forage material passes over a shaped floor plate 30 indicated in a general fashion by the dotted lines in FIG. 1.

It will be understood that the dimensions and proportions shown in FIG. 1 and in the several figures yet to be discussed are selected for the sake of making the drawings clear, and are therefore not necessarily dimensions or proportions which would be used in actual practice. It will also be understood that, in typical use of the invention on farm machines, the detector may alternatively be located in a variety of places such as at the front of the vehicle, or on the tractor pulling the vehicle.

During various operations using such farm tools, such as sowing, planting, mowing, raking, or the like, it is possible for machine parts made of iron or other magnetic materials to break off or to simply drop off the farm machine being used without knowledge of the operator and to be lost in the field. Typically, these pieces of tramp metal are composed of magnetic materials such as iron, and include bolts, pins, rake teeth, idler pulleys, chain links, mower sickle teeth, hand tools, pieces of wire and the like. During use of a forage harvester such as that of FIG. 1 for harvesting sorghum, alfalfa, or other types of fodder, such pieces of tramp metal can be picked up by the harvester pickup unit 11 and may pass into the environs of the cutterhead 18, causing extensive damage to it.

To prevent such damage during the critical time of forage harvesting, it is desired to place a tramp metal presence detector in the path M-N-O-P that the crop travels in moving toward cutterhead 18. The tramp metal detector is placed in such a location that sufficient time is allowed in which manually or automatically to stop at least rolls 14,15 before the tramp metal part reaches cutterhead 18. It will be apparent that other or alternative moving parts of the forage harvester of FIG. 1 or of other monitored equipment may be automatically caused to stop, such as cutterhead 18 or even all of the rotatable parts of the farm machinery. The towing tractor may also readily be stopped automatically or by the operator in response to a detector actuated alarm.

Figure 2:
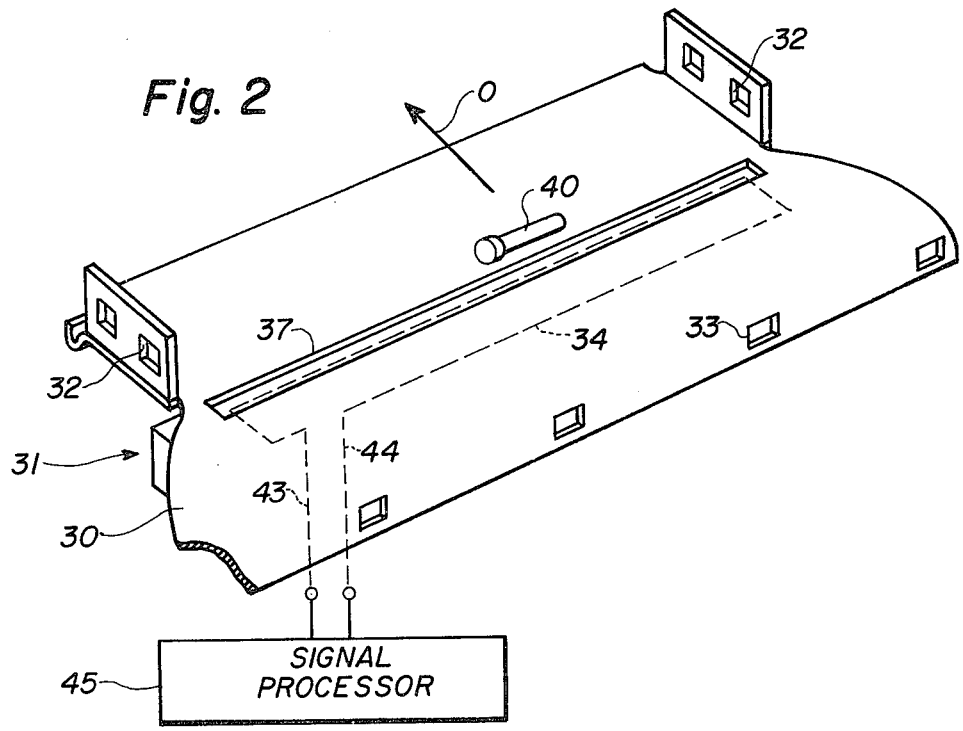
FIG. 2 is a view of part of the machine of FIG. 1 showing the location of the metal detector relative to the floor of the machine.

As seen in FIG. 2, the tramp metal sensor 31 can be mounted in close association with the floor plate 30 which forms a part of the structure adjacent cutterhead housing 10, being bolted to the header 11 in front of the aperture leading to rolls 14,15 by using conventional bolt holes such as holes 32,33. Also, if preferred, sensor 31 can be located in a magnetically transparent feed roll. Sensor coil 34, indicated by the dotted line in FIG. 2, is preferably a multiple turn coil placed in a particular magnetic field generated by means yet to be discussed in further detail in connection with FIGS. 3 and 4. The magnetic fields, if floor plate 30 is made of aluminum or of a plastic or other non-magnetic material, thread the plate 30 and extend above it to return through plate 30 to their sources. Should plate 30 be made of a magnetic material, a slot 37 placed symmetrically in plate 30 above sensor 31 will permit use of substantially the same magnetic field configuration. Slot 37 is preferably filled with a plastic material to preserve the continuity of the upper surface of plate 30.

In the presence of the magnetic fields, an output voltage is generated by pickup coil 34 when an object of metallic material such as 40 passes through one of the magnetic field regions. It will be understood that signal pickup coil 34 for sensing any magnetic field change caused by pin 40 is located in the same region as the sources of magnetic field so as substantially to reduce the noise signals coupled to signal pickup coil 34 caused by rotation of elements such as feed rolls 14,15, auger 24 and the like.

In the presence of a moving metallic object 40, a corresponding monitor alarm signal is generated in coil 34 and is received on leads 43 and 44 leading to signal processor 45.

Signal processor 45 is then used to activate control equipment (not shown) which stops the mechanism, such as rolls 14,15 and cutterhead 18, as previously described, when the presence of undesirable metal is detected.

Prior art metal detector apparatus typically created magnetic field lines of flux which were oriented parallel to direction of motion O of crop material and tramp metal 40 within the forage harvester. This parallel orientation created conditions which causes severely diminished response to essentially rod-like metallic material 40 oriented transverse to the crop material flow and the magnetic fields. The present invention overcomes the previous deficiency by creating a magnetic field portions of which are not parallel to each other, thus assuring that at least a portion of the field is also not parallel to the material flow. This eliminates the undesirable insensitivity to certain orientations of the metallic material to be detected.

FIG. 3 and FIG. 4 show two embodiments of magnetic field generators which provide the non-parallel lines of magnetic flux which prevent the existence of particular orientations of metal which might pass undetected.

FIG. 3 depicts a section of metal sensor 50 consisting of mounting plate 52 upon which are mounted magnet members in the form of cylindrical magnetic poles 54,56,58 and 60, each enclosing their respective opposite pole 55,57,59 and 61. These magnet members can be constructed either of permanent magnets or as electromagnets, but, for simplicity of the figures, the magnets are depicted as permanent magnets, thus eliminating the confusion of showing the electro-magnetic coils required to power electro-magnets. Sensing coils 62 are typically wrapped around the center poles 55,57,59 and 61. These sensing coils operate in the same manner as the sensing coils of prior metal detectors in that the altered magnetic lines of flux caused by metal moving nearby, and particularly in the region between the poles, induces electrical signals into the sensing coils. These sensing coil signals are combined and processed to determine the presence of undesirable metallic material.

Although the total magnetic field generated by the sensor configuration 50 of FIG. 3 is symmetrical and regular, it essentially creates the effect of a multi-directional magnetic field, that is, a field with some magnetic lines of flux in all directions, and thus successfully prevents any tramp metal from escaping detection regardless of the geometry or orientation of the metal.

The configuration of magnets shown in FIG. 3, with individual magnet fields, as depicted by field 64 associated with poles 58 and 59, radiating in all directions from center pole 59 to cylindrical pole 58, provides non-parallel magnetic lines of flux at least some of which will be affected by any metal passing nearby, regardless of its orientation to material flow direction O. Furthermore, the staggered two-row pattern of outermost poles 54,56,58 and 60 is constructed to overlap slightly in the direction traverse to material flow, so that no metal can pass over sensor 50 without affecting at least one magnet configuration.

FIG. 4 shows an alternate embodiment of sensor magnet configuration which creates another magnetic field pattern with non-parallel lines of flux which prevent the possibility that metal will escape detection because of its orientation.

Magnet section 70 is constructed of magnet members with an offset double toothed geometry with poles 72,74 and 76 located on opposite sides of a channel-like single magnet from opposite poles 73,75 and 77. Channel web 78 is continuous and completes the magnet circuit return path for all magnet pairs. The offset configuration of poles relative to the material flow path, where each pole is directly opposite a cutout on the opposite side of channel web 78 and angularly offset from the nearest opposite poles, results in magnetic flux lines, shown by typical line 80 between poles 74 and 75, line 82 between poles 74 and 77, and line 84 between poles 77 and 76, at varying angles to each other and material flow direction O. While the actual angular variation from the direction of material flow O depends upon the particular dimensions and specific configuration of the pole faces and web 78, flux lines 86 and 88 shown between poles 72 and 73 depict a typical angular variation possible.

It is this varying angular configuration which, as in the embodiment of FIG. 3, assures that magnet section 70 will sense all possible geometries and orientations of metallic objects moving with the processed material. The flux lines, as depicited by line 86 and 88, along with the interlocking aspect of the multiple fields, as depicted by lines 80 and 82, create a field pattern which will be affected by tramp metal objects moving across it, no matter what orientation or configuration that metal has. The perturbation of the field caused by the metal will then be detected by sensing coils 90 and 92.

Sensing coil 90 is shown wrapped around web 78 as a typical location. However, coil 92 shown wrapped upon pole 73 is also a suitable sensing coil location, in which case similar coils would be used either with other poles 75,77 and 94 on the same side of web 78 or in cooperation with similar coils on poles 72, 74 and 76. Moreover, while magnet section 70 is depicted as a permanent magnet, both coil 90 and coil 92 are suitably located to serve as excitation coils for an electro-magnet version of magnet section 70. As would be clear to those skilled in the art of magnet excitation and magnetic metal detectors, many other suitable locations for both sensing and excitation coils are available with the configuration of magnet section 70.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, a configuration similar to that of FIG. 4 could be constructed by the use of multiple individual offset horseshoe magnets, and the pole faces of either the embodiment of FIG. 3 or FIG. 4 could be constructed in a different configuration.

The foregoing has described magnet members arranged to create a unique pattern of magnetic fields which sense all pieces of metal passing within the fields at approximately the same signal level without severely diminished signal for one particular orientation.

It is anticipated that aspects of the present invention, other than those specifically defined in the appended claims, can be obtained from the foregoing description and the drawings.

Having thus described the invention, what is claimed is:

1. In a metal detector suitable for protecting rotatable machine elements in harvesting machines comprising means for generating a magnetic field in a material flow path, at least one sensing coil in which an electrical signal is induced when the magnetic field is altered by the presence of metallic material, and a signal processor to initiate a control sequence to limit damage to the elements when the presence of undesirable metal is detected, the improvement comprising:

means for producing a pattern of magnetic fields in the material flow path, portions of said fields being other than parallel to each other, said means being a magnet configuration having a plurality of magnet members, one of said magnet members being in a first row, others of said magnet members being in a second row, said rows being traverse to the material flow path and said magnet members of said first row being in staggered relationship with the magnet members of the second row.

2. The metal detector of claim 1 wherein each magnet member is a cylindrical configuration having a portion of a first magnetic polarity surrounding a portion of the opposite magnetic polarity.

3. The metal detector of claim 1 wherein each magnet member in said first row is of a first magnetic polarity and each magnet member in said second row is of the opposite magnetic polarity.

* * * * *